United States Patent Office 3,448,309
Patented June 3, 1969

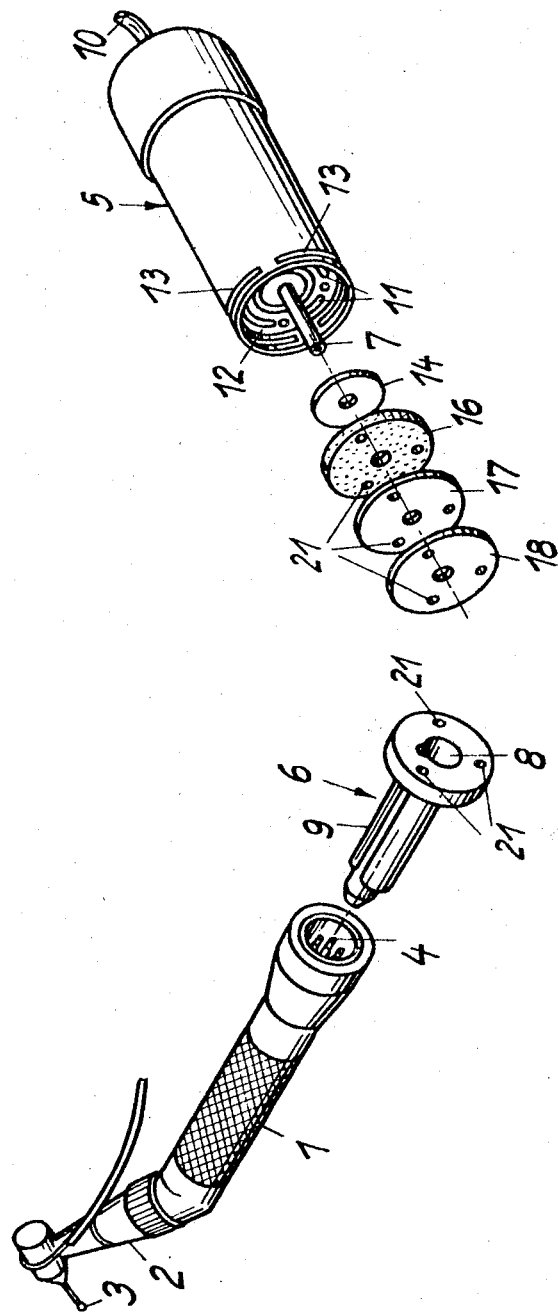

3,448,309
MINIATURE ELECTRIC MOTOR
Kurt Epp, Erlangen, Germany, assignor to Siemens Aktiengesellschaft, Erlangen, Germany, a corporation of Germany
Filed Nov. 7, 1966, Ser. No. 592,425
Claims priority, application Germany, Oct. 29, 1965, S 100,701
Int. Cl. H02k 5/24
U.S. Cl. 310—51                          3 Claims

ABSTRACT OF THE DISCLOSURE

Miniature electric motor cooled by compressed air comprising a cylindrical housing provided with a compressed air feed and at least one aperture used for the discharge of the compressed air, said aperture being provided in the cylindrical jacket surface of the housing, and whose inner edges adjoin the marginal surface of a disk of porous material located in the housing, the width of which disk corresponds to at least the size of the discharge opening and whose one frontal surface is directed toward the current of compressed air, in order to avoid disturbing discharge noises of the compressed air.

---

The present invention relates to a miniature electric motor having a cylindrical housing which is provided with a supply line and with at least one outlet aperture for the compressed air which is used for cooling the motor and which flows through the motor in the axial direction.

Such miniature motors are used nowadays as direct drives in dental handpieces. The motors are generally subjected to a very considerable load, so that a fairly considerable amount of cooling air is required. But only relatively small-area outlet apertures situated substantially in the direction of the axial cooling air flow are available for the outflow of the air from the small motor housings, so that the cooling air escapes from these apertures with a hissing or whistling noise. The invention has as its object to eliminate these disturbing noises. This problem is solved according to the invention in that the outlet aperture is provided in the cylindrical wall surface of the housing and is masked by porous material (e.g. sintered material). Air outlet noises are obviated by the deflection of the air before it issues in a radial direction, and by the outflow of the air from the many small pores in the masking material. The many small pores in the porous material, through which the compressed air issues, make it possible to provide relatively large-area apertures in the motor housing, for example one or more transverse slots, so that the issuing compressed air is distributed over a relatively considerable part of the periphery of the housing. Such transverse slots are simple to form from the manufacturing technique point of view, they prejudice the stability of the housing only to a slight extent, and owing to the narrowness of the slots they still provide good protection against water splashes, and other fouling, for the motor which is arranged in the housing, despite the relatively large outlet cross-section.

The simplest way of shielding the transverse slot or slots by porous material is to insert a disc of porous material (e.g. a disc of sintered material) concentrically in the interior of the housing in such a manner that its edge surface masks the slot in the housing; the desired effect is obtained that the flow of compressed air is deflected in the disc from its axial direction into a radial direction, slowing-down the speed of flow of the cooling air and thus obviating the production of noise to a very considerable extent. An air-tight cover provided at the end face of the porous disc remote from the flow of compressed air promotes the direction-changing effect.

In some cases, for example, if the motor is used for driving a dental bur, it may be convenient for the end face of the porous disc which is remote from the flow of compressed air to be covered in a completely air-tight manner, so that no air can escape at the connection zone between motor and handpiece which could prejudice the sterility of the dentist's hand holding the handpiece owing to fouling of the said air (carbon abrasion residue from the motor). But it may also be expedient to only partly cover the said end face, so as to maintain a positive pressure in the dental handpiece driven by the motor and thus to prevent the entry of dirt from the drilling zone into the transmission element of the tool.

The invention will be explained in more detail hereinafter with reference to an example of embodiment illustrated in the figure. In this example of embodiment the miniature electric motor is used for driving a dental bur.

The handpiece is designated as 1. The bur 3 is clamped in its head part 2. Within the handpiece, coupling means 4 are provided with which the cylindrical motor housing 5 can be attached rotatively to the handpiece by means of the intermediate part 6. The shaft 7 of the electric motor then extends through the aperture 8 of the intermediate part 6, which comprises the coupling elements 9 associated with the coupling elements 4, into the interior of the handpiece 1 and moves the driving parts (not shown) for the bur.

A supply line 10 for electric current and compressed air is provided at the rear end face of the motor housing 5. Near the front end face of the housing the fixing plate 12 provided with the ports 11 is inserted. The transverse slots 13 are provided in offset manner at the periphery as outlet aperture means for permitting the escape of cooling air from the housing. Onto the fixing plates 12 there are secured in succession the discs 14, 16, 17, 18 and the intermediate part 6, by means of the screws (not shown) which are inserted through the holes 21. For this purpose the fixing plate 12 is provided with suitable screw threaded holes. The discs 14 and 17 consist of tetrafluoroethylene, the disc 16 of sintered material and the disc 18 of the thin sheet metal.

The discs 14, 17 and 18 are only required when the motor housing is to be sealed in air-tight manner relatively to the tool (dental handpiece).

The porous disc 16 made of sintered material is so wide that its edge surface—after the disc 16 has been fixed on the plate 12—completely masks the slots 13 in the motor housing from within. After the cooling air has flowed through the housing 5 and the ports 11 in the plate 12, it passes axially into the porous disc 16 and is there deflected to a radial direction whereupon it escapes through the housing slots 13. No disturbing exit noises are produced by the air in doing so.

The invention makes it possible to increase the throughput of cooling air through the motor, which hitherto has always been required in order to avoid having the handpiece heated to an extent which might be a nuisance to the dentist, but which has not been successfully achieved owing to the relatively considerable, audible, unpleasant rushing and hissing noises made by the air in escaping. Even after increasing the cooling air throughput to the value necessary from the point of view of cooling the motor, with the subject of the present invention no air exit noises worth mentioning can be heard.

While I have illustrated a preferred embodiment of my invention, many modifications may be made without departing from the spirit of the invention; and I do not wish to be limited to the precise details of construction set forth, but desire to avail myself of all changes within the scope of the appended claims.

I claim:

1. Miniature electric motor having a cylindrical housing which is provided with a supply line and with at least one transverse outlet slot for the compressed air used for cooling the motor, characterized in that the outlet aperture (13) is provided in the cylindrical wall surface of the housing (5) [and is masked by porous material (16)], and in that the inner edges of the slot (13) adjoin the edge surface of a disk (16) made of porous material, the width of which corresponds at least to the width of the slot, one end face of which is directed toward the flow of compressed air whereas the other end face is at least partly covered in air-tight manner.

2. Miniature electric motor cooled by compressed air comprising a cylindrical housing provided with a compressed air feed and at least one aperture used for the discharge of the compressed air, said aperture being provided in the cylindrical jacket surface of the housing, and the inner edegs of which aperture adjoin the marginal surface of a disk of porous material located in the housing, the width of which corresponds to at least the size of the discharge surface and whose one frontal surface is directed toward the current of compressed air.

3. Electric miniature motor cooled by compressed air according to claim 2, whereby the other frontal surface of the porous disk is covered at least in partially air-tight fashion.

References Cited

UNITED STATES PATENTS 2,643,731   6/1953   Schmid _____ 181—55

MILTON O. HIRSHFIELD, *Primary Examiner.*

L. ROUSE, *Assistant Examiner.*